United States Patent
Eldumiati et al.

(10) Patent No.: US 6,980,590 B1
(45) Date of Patent: Dec. 27, 2005

(54) PROCESSING DIAGNOSTIC AND IDENTIFICATION DATA IN AN ANALOG MODEM SYSTEM

(75) Inventors: Ismail Eldumiati, Irvine, CA (US); Dean Grumlose, Dana Point, CA (US); Jim W. Johnston, Santa Margarita, CA (US); Charles Raasch, Lake Forest, CA (US); Philippe Richard, Lake Forest, CA (US); Andy Webster, Irvine, CA (US); Joel Peshkin, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 749 days.

(21) Appl. No.: 09/662,405

(22) Filed: Sep. 14, 2000

Related U.S. Application Data

(60) Provisional application No. 60/153,897, filed on Sep. 14, 1999.

(51) Int. Cl.$^7$ .............................................. H04B 1/38
(52) U.S. Cl. .................................................... 375/222
(58) Field of Search ................. 375/222, 365, 375/366, 368, 219, 220, 354, 362, 377; 370/229, 370/235; 379/1.01, 2, 418, 93.01; 455/26.1

(56) References Cited

U.S. PATENT DOCUMENTS

| | | | | |
|---|---|---|---|---|
| 4,782,498 A | * | 11/1988 | Copeland, III | ............... 375/222 |
| 5,208,812 A | * | 5/1993 | Dudek et al. | ............... 370/280 |
| 5,311,596 A | * | 5/1994 | Scott et al. | .................... 380/33 |
| 5,367,148 A | * | 11/1994 | Storch et al. | ............... 235/375 |
| 6,513,068 B1 | * | 1/2003 | Jones et al. | ................. 709/236 |
| 6,757,290 B1 | * | 6/2004 | Kalmanek et al. | .......... 370/401 |

* cited by examiner

*Primary Examiner*—Mohammed Ghayour
*Assistant Examiner*—Pankaj Kumar
(74) *Attorney, Agent, or Firm*—Farjami & Farjami LLP

(57) ABSTRACT

In a modem system connecting two modems over the telephone lines, a method is disclosed that transmits identification data regarding the two modems. Furthermore, the connection between the two modems may be optimized based upon information regarding the compatibility of the two modems. In addition, a secondary logic channel, which may remain open throughout the duration of the connection may also be used to transmit data about the modems. The secondary logic channel would only transmit data if the primary data channel is not being fully used. The secondary logic channel may be used to transmit various diagnostic information between the modems.

46 Claims, 2 Drawing Sheets

PROCESSING DIAGNOSTIC AND IDENTIFICATION DATA IN AN ANALOG MODEM SYSTEM

This application claims the benefit of U.S. provisional application No. 60/153,897, filed Sep. 14, 1999.

BACKGROUND OF THE INVENTION

1. Technical Field

The present invention is related to an analog modem system, and more particularly, to an analog modem system in which a second logical channel is used to transmit certain diagnostic data.

2. Background Information

In a typical analog modem system, illustrated in FIG. 1, one modem 102 connects to another modem 104 via telephone lines 106 to transmit and receive information. In order for the modems to communicate with each other, each modem must first determine what type of modem with which it is attempting to communicate, in order to, inter alia, transmit data at the correct rate, using an optimum protocol.

For a number of reasons, it may be desirable to enable one modem device to identify itself to another modem device during the modem initialization process such that, if the devices are compatible with each other, a number of enhanced features can be prompted or employed. The use of such differentiated features may allow certain compatible modem devices to operate in an improved manner, relative to incompatible modem devices. However, the standard handshake sequences used by two modem devices (typically client and central site modems, although the invention may be used in the context to two client modems or two central site modems) to establish communications have only a limited capability to exchange manufacturer-specific information for system identification, configuration, and diagnostics.

The conventional V.8bis handshake sequence provides some capability to exchange system-specific information during the initial handshake procedure. For instance, some modem manufacturers use this V.8bis handshake sequence to exchange limited diagnostic and identification information. This exchange is only available at the beginning of a call, however, as manufacturers generally do not wish to prolong the handshake sequence. Using the handshake sequence to exchange diagnostic and identification information is generally undesirable, as the user would be sitting and waiting longer for the connection to be established. During the handshake sequence, data is being transmitted at a relatively low rate until the modems determine the type of modem with which it is communicating, they cannot transmit at their maximum speed. Therefore, it is not desirable to transmit a large amount of data before the handshaking sequence is completed and a data channel is opened.

The manner in which the modem devices exchange the identification data and the type of data exchanged can be varied to address a number of practical issues, e.g., improved performance at a central site ISP location, improved diagnostic information available to the central site ISP location, as well as differentiated features that may be developed in the future. The performance associated with a central site may be related to the number of unintentional call disconnections, the number of calls that progress beyond the initial handshaking procedure, the data rates obtained during the connections, and other functional aspects of the modem connections established through the central site.

During the handshaking procedure, it may be desirable to exchange as much information as possible for diagnostic and identification reasons. Such an exchange should consider the duration of the handshake sequence: it is typically undesirable to significantly lengthen the duration of the handshake sequence. Furthermore, the transmission of diagnostic data and identification information should be transparent to the user. In addition, it is desirable to identify the client modem very early in the handshake sequence so that the central site modem can capture the information and utilize it to help diagnose and address connectivity problems in the field. It is thus desirable for a modem to have a short handshake period along with full-featured end-to-end diagnostics. It would be desirable to enhance the ability of the two modem devices to exchange such information, without burdening the initial handshake and thereby delaying the time needed to establish a connection. In addition, it would be desirable to establish the presence of a communications channel between the two modem devices that is available throughout the call, not just at the beginning of the call.

One method for satisfying some of those needs is the installation of a higher-level application program, e.g., an SNMP-based or an HTTP-based application, that can be used for the exchange of diagnostics, configuration, and the like. However, these types of programs tend to be costly, and, as such, they are not yet widely deployed.

SUMMARY OF THE INVENTION

The present invention is directed to a method that satisfies these needs. A method having features of the present invention includes connecting two modems with each other over the telephone lines. Then a handshaking sequence may be performed and identification data may be transmitted between the modems. A primary data channel is opened between the two modems.

Diagnostic and maintenance data may also be transmitted between the two modems. This diagnostic and maintenance data may include customer platform identification data, customer code revision identification data, modem initialization data, a remote query by said first modem of the responses of said second modem to AT commands or other, proprietary, commands, information regarding the status of call waiting, remote network management information, system configuration data, transmitting a command from said first modem to said second modem and transmitting a response from said second modem to said first modem in response to said command, firmware revision data transmitted from one modem to the other modem, uniquely generated call identification data, time information, information regarding the types of modems being connected, and information regarding which telephone line is being used. Unique or pseudo-unique data may also be transmitted or stored that contains information about each connection.

Each of the above-described data may be transmitted on a second logical channel that may be opened after a primary data channel is opened. The second logical channel may be configured such that, when the second logical channel is used only when the two modems are not using the primary data channel to full capacity.

BRIEF DESCRIPTION OF THE DRAWINGS

The invention is further described in connection with the accompanying drawings, where like reference numbers depict like elements, in which.

DETAILED DESCRIPTION

Figure 1:
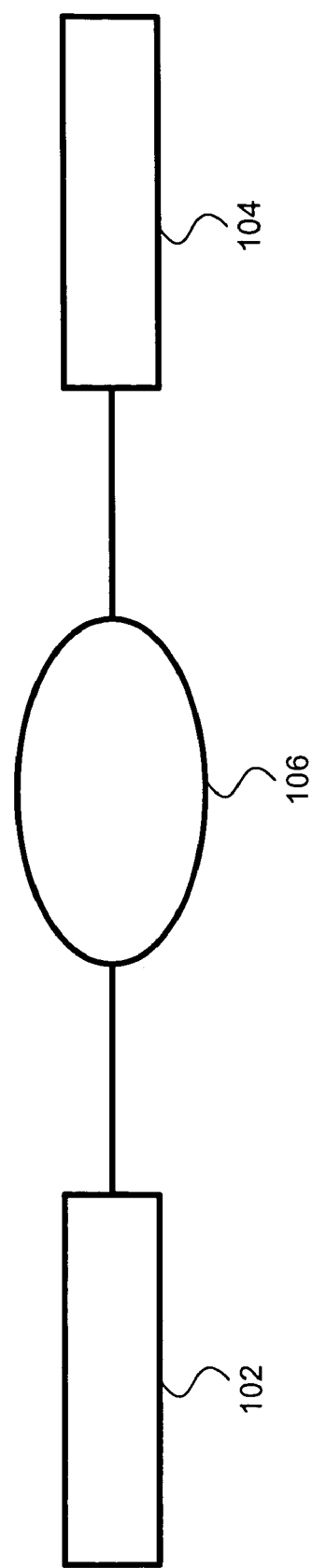
FIG. 1 depicts a typical connection between two modems.
Figure 2:
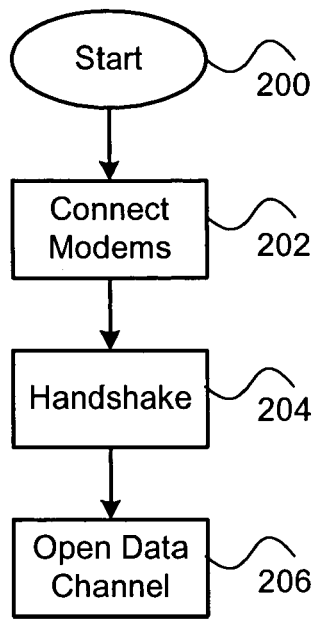
FIG. 2 shows a flow chart of the connection procedure as described in this application.

FIG. 2 is a flowchart illustrating the operation of modem system of the present invention. In step 202, two modems are connected to each other. Typically, this step is accomplished when a second modem dials a phone number that is answered by a first modem. The first may belong to a Network Service Provider ("NSP") or an Internet Service Provider ("ISP"), although the first modem may be operated by any number of people or entities. At step 204, the modems perform a handshaking step in which the modems exchange various information. After the handshaking is complete, normal operation of the modem continues at step 206, wherein a data channel is opened at an optimum speed and both the first and second modems transmit and receive data.

Step 204 may be accomplished by using existing V.8bis or other mechanisms (e.g., a combination of V.8bis, V.8, V.25, and/or other features associated with conventional data communication protocols): the client and central site modems may identify that they are compatible with certain specifications, features, or the like. In addition, the modem devices may exchange an amount of data (e.g., 4 bytes (32 bits) of information) that contains an identification of certain types of data, such as:

a) A Platform Identifier;

b) A Controller Revision (if applicable);

c) A DSP Revision; or d) A Firmware Revision.

Both modem devices may transmit a suitable amount of identification data to each other in a bi-directional manner. The identification data may be encoded in accordance with any number of coding algorithms. It should be noted that all of the information can be transmitted, received, and processed without any specific involvement of the end users. The capture of this information during the early part of the handshake can be very helpful in identifying and diagnosing connectivity problems, particularly in connections that fail before communication protocols such as V.42 can be established. It also enables the ISP or NSP to determine if the client modem requires a code update by analyzing any revision data contained in the exchange.

One potential problem that may occur is that non-compatible modems might choose to copy the specific identification codes (or the encoding algorithm) without realizing that such codes may impact the identification process associated with compatible modems. This could lead to misidentification of clients in the field, or misattribution of connectivity problems. One possible solution that could address this concern is to have the central site modem transmit a pseudo-randomly generated code word that is different on each call during the V.8bis exchange. The client modem could run the received code word through a predetermined scrambler and transmit it back to the central site. The central site would compare the received code word with what it expects to receive. While it is possible for non-compatible modem manufacturers to discover such encoding techniques, such a discovery would not be easy and would be a time consuming effort. Indeed, the scrambler polynomial and the operation of the identification coding need not be publicized.

The mere exchange of such identification data can be useful for diagnostic and statistical reasons, even if the call is not eventually established. In other words, it may be desirable to obtain and analyze information related to the type, revision, and model of the modems that have performed such an initialization procedure, regardless of whether the modem devices progress to the data mode. Also, once the two modems know that the other is compatible, they may attempt to leverage this information throughout the call by, e.g., transmitting the data in a particular format that is unique to the compatible modems.

Background Channel after Handshake

ITU-T Recommendation V.42 contains provisions for a second logical channel without designating what such channel can be used for. Although V.42 relates to error correction techniques, the second logical channel of V.42 may be utilized in an unrelated manner as a handy background maintenance/diagnostic channel by which the client and central site modems can have a proprietary dialogue. As the end-users are not typically transmitting at maximum rates during the beginning (or even the middle) of a call, there should be sufficient time for a diagnostic exchange to occur in the background without impacting the end users' call setup or use experience. The second logical channel may be used throughout the duration of a call. In the presence of customer data, the second logical channel could have a lower priority than user data, such that there is no apparent effect on the flow of user data. If no unexpected barriers arise, the second channel could be used to transmit a wide variety of data, including, but not limited to:

a) Customer platform identifier;

b) Customer code revision Identifier;

c) Modem initialization strings, or other configuration information;

d) Remote Query by the central site of client AT command responses; or e) Remote query by the central site of the client for client status outside of standard AT commands through a proprietary diagnostic query/response mechanism; or f) Software and driver upgrades.

Note that the transmission of some of this information may require cooperation with the user of the second modem to gather the information. However, it is not desirable to add too much complexity to the client. One approach could be to have the client do a blind "data dump" of information upstream.

Another approach could be to support standard AT commands. In conventional modem systems, AT commands originate with an end user; central site modems are typically not capable of requesting diagnostic information from the client modems. The second logical channel could be utilized to enable the central site modems to specifically query the client modem device using AT commands, without interrupting the data mode. In the alternative, a proprietary diagnostic query/response mechanism may be used to transmit the data. In a similar manner, the client modem can also receive information from the server, such as a firmware revision or a patch to fix a bug.

Since an end user typically does not transmit much data at the beginning of a call in the upstream direction (i.e., from a client site to a central site modem), it is feasible for the client modem to send a "data dump" of desirable information (e.g., manufacturer identification, initiation and dial strings used, status of call waiting disabling, or the like) in the upstream direction. If this information is encoded in a second logical channel, and if the central site modem device properly strips out the second channel, the central site modem can gather this information and route it to higher protocol layers within the remote access concentrator. This information can be utilized for improved remote modem management, among other things.

The present invention is not limited to any specific types or forms of data that may be conveyed by the second logical channel, or the manner in which such data is used by the modem system. In a preferred practical embodiment, the second channel may be used for diagnostics, remote network management, platform/model identification, or system configuration data.

One possible implementation is to have the central site modem use the second logical channel to send an AT command downstream to the client modem. The client could then transmit its response to the command upstream to the central site modem, via the second logical channel. If the user desires to send information upstream, then such transmission may take precedence over the second logical channel, because the secondary channel is given lower priority. Accordingly, the present invention may be implemented without any noticeable effect or disruption to the client user because the secondary channel is only used when the overall data channel has excess capacity.

Figure 3:
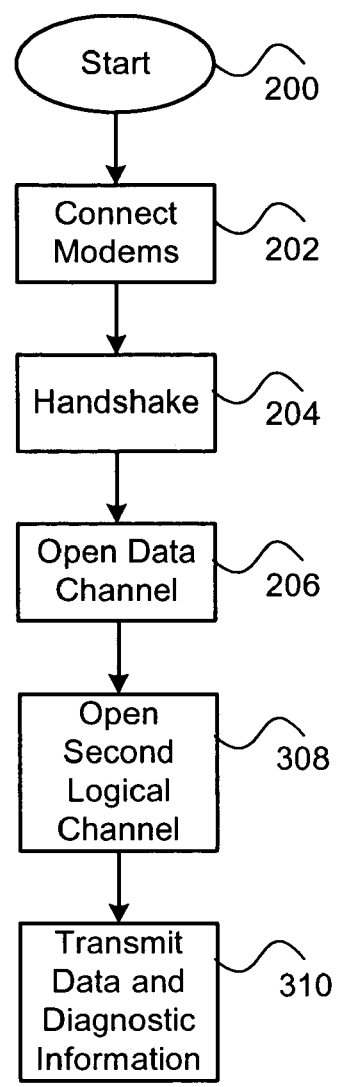
FIG. 3 shows a flow chart of the connection procedure of another embodiment described in this application.

The operation of this embodiment is illustrated in FIG. 3. Following connection step 202, handshaking step 204, and opening data channel at step 206, step 308 opens a secondary logic channel, followed by step 310 in which normal operation of the modem system continues, with data being transmitted on both the primary data channel and the secondary logic channel.

Another possible use of the secondary channel is to uniquely or pseudo-uniquely identify each call through the use of a call cookie. This may be a random or pseudo-random number generated by either the client or the central site modem. This number is associated with the line, time of day, duration, amount of information transmitted and received, and the identification of the modems through database techniques well known in the art. This identifier may be transmitted through the secondary channel at some point during the call. The central site modems may use this information to determine if their modems are operating properly. This information may also be used to determine if a specific combination of line, modem, and service conditions cause performance or connectivity issues. Isolating the connection to specific modems and line conditions can provide valuable information in diagnosing and debugging performance and connectivity issues.

In summary, the use of the V.42 second logical channel can provide a richer and more flexible communication channel than that used during the conventional V.8bis exchange. The second logical channel contemplated by the present invention may be available throughout the duration of the call rather than being restricted to the beginning of the call. The second channel need not interfere with the data being transmitted and received by the end user, because the diagnostic or management data transmitted over such second channel may be designated with a lower priority than user data. In addition, the benefits of the present invention may be realized without purchasing or deploying a complicated "modem management" application.

This level of capability may require the presence of an application such as an SNMP agent, or the applications being offered by various suppliers of diagnostic software. Although presently these applications are expensive and are not yet common, they can incorporate the above features of the present invention to offer effective and rich remote diagnostics and control of the modem system. For example, once both modem devices have exchanged a suitable amount of identification data, then any number of additional features may be implemented in a manner that leverages such knowledge. In a practical application, the modem devices may utilize different training schemes, retraining schemes, or other functional parameters according to the identification data, which relates to the particular modem devices connected during the given communication session.

In conclusion, it should be appreciated that the description of the present invention herein pertains to preferred embodiments and that the concepts of the invention may be extended to other practical applications. In addition, the current V.8, V.8bis, and V.42 Recommendations, along with any related appendices and attachments, are incorporated by reference herein.

We claim:

1. A method for use by a first modem to establish a data communication session with a second modem, said method comprising:
   calling said second modem via a telephone line;
   starting a physical handshaking process with said second modem;
   transmitting a pseudo-randomly generated code word to said second modem during said physical handshaking process;
   receiving a scrambled code word from said second modem, wherein said scrambled code word is generated by scrambling said code word during said physical handshaking process;
   analyzing said scrambled code word during said physical handshaking process;
   determining if said second modem meets a compatibility criteria based on said analyzing during said physical handshaking process; and
   exchanging identification data with said second modem if said determining determines that said second modem meets said compatibility criteria, wherein said identification data are indicative of a manufacturer identity of said first modem and a particular modem version number of said first modem.

2. The method of claim 1 wherein said identification data comprises information selected from the group consisting of a platform identifier, a controller revision, a DSP revision, and a firmware revision.

3. The method of claim 1 further comprising
   completing said physical handshaking process to start said data communication session with said second modem;
   optimizing said data communication session based on said compatibility criteria;
   wherein said exchanging said identification data occurs after said completing said physical handshaking process.

4. The method of claim 1 further comprising
   optimizing said data communication session based on said identification data, wherein said exchanging said identification data occurs during said physical handshaking process.

5. The method of claim 1, wherein after said determining, said method further comprising:
   opening a primary data channel;
   thereafter opening a second logical channel; and
   transmitting diagnostic/maintenance data to said second modem using said second logical channel.

6. The method of claim 5 wherein said diagnostic/maintenance data comprises customer platform identification data.

7. The method of claim 5 wherein said diagnostic/maintenance data comprises customer code revision identification data.

8. The method of claim 5 wherein said diagnostic/maintenance data comprises modem initialization data.

9. The method of claim 5 wherein said diagnostic/maintenance data comprises a remote query by said first modem of the responses of said second modem to AT commands.

10. The method of claim 5 wherein said diagnostic/maintenance data comprises information regarding a status of call waiting.

11. The method of claim 5 wherein said diagnostic/maintenance data comprises remote network management information.

12. The method of claim 5 wherein said diagnostic/maintenance data comprises system configuration data.

13. The method of claim 5 wherein said transmitting said diagnostic/maintenance data further comprises:
    transmitting a command to said second modem; and
    receiving a response from said second modem in response to said command.

14. The method of claim 5 wherein said diagnostic/maintenance data comprises firmware revision data transmitted from said first modem to said second modem.

15. The method of claim 5 wherein said diagnostic/maintenance data comprises uniquely generated call identification data.

16. The method of claim 15 wherein said call identification data comprises time information.

17. The method of claim 15 wherein said call identification data comprises information regarding the types of modems being connected.

18. The method of claim 15 wherein said call identification data comprises information regarding which telephone line is being used.

19. The method of claim 5 wherein said second logical channel is used simultaneously with said primary data channel.

20. The method of claim 19 further comprising:
    analyzing said primary data channel and said second logical channel for usage; and
    prioritizing said primary data channel if both said primary data channel and said second logical channel are simultaneously used.

21. The method of claim 5 further comprising
    transmitting said identification data on said second logical channel.

22. The method of claim 5 wherein the diagnostic/maintenance data is used to optimize the data communication session.

23. The method of claim 5 further comprising:
    sending AT commands to the second modem on the second logical channel; and
    receiving a response to said AT commands from said second modem.

24. The method of claim 5 further comprising:
    receiving AT commands from the second modem on the second logical channel; and
    transmitting a response to said AT commands.

25. The method of claim 5 wherein said diagnostic/maintenance data comprises a remote query to responses of said second modem to diagnostic query commands.

26. The method of claim 5 wherein said diagnostic/maintenance data comprises a random or pseudo-random number which indexes into a database uniquely or pseudo-uniquely identifying call conditions.

27. The method of claim 5 further comprising:
    sending a query command to the second modem on said second logical channel; and
    receiving a response to said query commands from said second modem.

28. The method of claim 5 further comprising:
    receiving a query command from the second modem on said second logical channel; and
    transmitting a response to said query commands to said second modem.

29. A modem identification method for use by a first modem, said method comprising:
    placing a call by said first modem to a second modem;
    entering a physical handshaking process;
    transmitting first modem manufacturer parameters to said second modem during said physical handshaking process, wherein said first modem manufacture parameters are indicative of a manufacturer identity of said first modem and a particular modem version number of said first modem;
    receiving second modem manufacturer parameters from said second modem during said physical handshaking process, wherein said second modem manufacture parameters are indicative of a manufacturer identity of said second modem and a particular modem version number of said second modem; and
    completing said physical handshaking process to establish a data communication session with said second modem.

30. The method of claim 29, wherein said first modem manufacturer parameters includes a DSP revision of said first modem.

31. The method of claim 29, wherein said first modem manufacturer parameters includes a firmware revision of said first modem.

32. The method of claim 29, wherein said first modem manufacturer parameters are transmitted as part of V.8.

33. A modem identification method for use by a first modem, said first modem begin in communication with a host, said method comprising:
    placing a call by said first modem to a second modem;
    completing a physical handshaking process to establish a data communication session with said second modem;
    establishing an error correction process with said second modem, said error correction process having a primary channel, for exchanging data between said host and said second modem, and a secondary channel;
    transmitting first modem manufacturer parameters to said second modem via said secondary channel, wherein said first modem manufacture parameters are indicative of a manufacturer identity of said first modem and a particular modem version number of said first modem;
    receiving second modem manufacturer parameters from said second modem via said secondary channel, wherein said second modem manufacture parameters are indicative of a manufacturer identity of said second modem and a particular modem version number of said second modem.

34. The method of claim 33, wherein said first modem manufacturer parameters includes a DSP revision of said first modem.

35. The method of claim 33, wherein said first modem manufacturer parameters includes a firmware revision of said first modem.

36. The method of claim 33, wherein said error correction process is based on V.42 Recommendation.

37. A method of authenticating an identification process for use by a first modem in communication with a second modem, said method comprising:
- starting a physical handshaking process with said second modem;
- receiving a random code by said first modem from said second modem during said physical handshaking process;
- scrambling said random code, in accordance with a predetermined scrambling process, to generate a scrambled code during said physical handshaking process;
- sending said scrambled code to said second modem to confirm compatibility during said physical handshaking process;
- receiving second modem manufacturer parameters from said second modem after said sending said scrambled code, wherein said second modem manufacture parameters are indicative of a manufacturer identity of said second modem and a particular modem version number of said second modem; and
- transmitting first modem manufacturer parameters to said second modem, wherein said first modem manufacture parameters are indicative of a manufacturer identity of said first modem and a particular modem version number of said first modem.

38. The method of claim 37, wherein said transmitting said first modem manufacturer parameters occur during said physical handshaking process.

39. The method of claim 37, wherein said transmitting said second modem manufacturer parameters occur after completion of said physical handshaking process and establishment of a data communication session with said second modem.

40. The method of claim 37, wherein said first modem manufacturer parameters include a firmware revision of said first modem.

41. The method of claim 37, wherein said first modem manufacturer parameters include a DSP revision of said first modem.

42. The method of claim 37, wherein said transmitting occurs during an error correction process based on V.42 Recommendation.

43. A first modem capable of exchanging identification data with a second modem, said first modem comprising:
- a call module capable of placing a call to a remote device;
- a handshaking module capable of entering a physical handshaking process with said second modem; and
- a transmitter capable of transmitting first modem manufacturer parameters to said second modem during said physical handshaking process, wherein said first modem manufacture parameters are indicative of a manufacture identity of said first modem and a particular modem version number of said first modem;
- a receiver capable of receiving second modem manufacturer parameters from said second modem during said physical handshaking process, wherein said second modem manufacture parameters are indicative of a manufacturer identity of said second modem and a particular modem version number of said second modem;
- wherein, after said transmitter transmits said first modem manufacturer parameter to said second modem and said receiver receives said second modem manufacturer parameter from said second modem, said handshaking module completes said physical handshaking process to establish a data communication session with said second modem.

44. The modem of claim 43, wherein said first modem manufacturer parameters include a DSP revision of said first modem.

45. The modem of claim 43, wherein said first modem manufacturer parameters include a firmware revision of said first modem.

46. The modem of claim 43, wherein said first modem manufacturer parameters are transmitted as part of V.8.

* * * * *

UNITED STATES PATENT AND TRADEMARK OFFICE
CERTIFICATE OF CORRECTION

PATENT NO. : 6,980,590 B1
DATED : December 27, 2005
INVENTOR(S) : Eldumiati et al.

It is certified that error appears in the above-identified patent and that said Letters Patent is hereby corrected as shown below:

<u>Column 8,</u>
Line 42, "begin" should be -- being --.

Signed and Sealed this

Twenty-third Day of May, 2006

JON W. DUDAS
*Director of the United States Patent and Trademark Office*